United States Patent [19]

Petersen

[11] 4,257,628
[45] Mar. 24, 1981

[54] PIPE CONNECTOR AND HOLE CUTTER

[76] Inventor: Robert E. Petersen, R.R. 1 Box 254, Walcott, Iowa 52773

[21] Appl. No.: 129,251

[22] Filed: Mar. 10, 1980

[51] Int. Cl.³ ............................................. F16L 41/06
[52] U.S. Cl. ...................................... 285/3; 137/318; 285/197; 285/337
[58] Field of Search ............... 285/197, 198, 199, 337; 137/318; 285/3, 4

[56] References Cited

U.S. PATENT DOCUMENTS

| 688,683 | 12/1901 | Phillips | 285/337 |
|---|---|---|---|
| 3,652,107 | 3/1972 | Tickett | 137/318 X |
| 3,817,271 | 6/1974 | Roven | 137/318 |
| 4,063,844 | 12/1977 | Pessia | 137/318 X |

*Primary Examiner*—Thomas F. Callaghan
*Attorney, Agent, or Firm*—Glenn H. Antrim

[57] ABSTRACT

A hollow body is connected by a compression seal and a split collar over a closed end of a first pipe containing fluid under pressure. A lateral screw-type cutter connected to the body has a circular knife edge with one or more scallops, the knife edge being formed and being positioned to cut cleanly a single slug from a first pipe at a point within the body near the seal. An end of the body opposite that end sealed to the first pipe has a nipple to which a second pipe is connected, and a strainer positioned across the nipple retains the slug within the body. Space between the first pipe and the body is sufficient to provide a passgeway for full flow of fluid through the hole of the first pipe to the nipple for the second pipe. The second pipe usually continues in a direction coaxial with the first pipe.

4 Claims, 5 Drawing Figures

PIPE CONNECTOR AND HOLE CUTTER

BACKGROUND OF THE INVENTION

This invention relates to pipe fittings used to make connections to pipes containing fluids under pressure, and particularly to a pipe fitting to be placed over a closed end of a pipe for connecting another pipe in the same direction and for cutting a hole in the closed end to permit full flow through the pipes.

To make repairs or to make alterations either in liquid systems or in gas systems, flow must often be interrupted in part of the system while flow is to be continued in the rest of the system. For example, within a dwelling or other building, pipes connected to a city water system need to be repaired or to be changed for new service. Commonly, two valves or shut-offs, are in a service line between a main line at a street and the system within the building. However, after many years of service, these valves become stuck so that they either cannot be operated at all or can be operated only after much costly labor.

Rather than attempting to close stuck or unaccessible valves for stopping flow to pipes, the pipes, such as lead pipes or copper pipes, can be closed quite readily by pounding to flatten opposite portions of the sides and thereby forcing the sides together along respective transverse lines to make respective tight diametrical crimps across the pipes. After a repair has been made in the portion of a system disconnected in such a manner from a supply line, fluid connection across the crimped portion is to be reestablished.

Types of fittings commonly used to tap into lines under pressure are similar to a fitting described in U.S. Pat. No. 3,554,217 issued to Henry Ehrens et al on Jan. 12, 1971. This fixture is to make connection to a new lateral branch line for a relatively small flow compared with the capacity of the line to which it is connected. A valve is included for controlling flow in the branch line. Fittings of this type are clamped to a pipe having fluid under pressure and are suitable for connecting branch lines that are small compared with the lines that are being tapped.

SUMMARY OF THE INVENTION

The pipe fitting of this invention is a connector with an integral pipe cutter. One end of the body of the connector fits over the closed end of a pipe, such as an end that has been closed by crimping to stop fluid under pressure, and the opposite end of the body in line with the closed end has a nipple for connecting another pipe to reestablish flow in the same direction. A cutter in a lateral extension of the body is operated inwardly and then outwardly to make a hole in the wall of the pipe near the closed end. Sufficient space is provided between the pipe that is being cut and the inside wall of the body to provide passageway for full flow of the fluid through the hole to the pipe connected to the nipple. A feature of the invention is the use of a coarse screen across the nipple. A slug made by the hole cutter is prevented by the screen from moving through the nipple into the pipe that is being connected.

A washer and an annular gasket fit tightly around the pipe to which connection is being made and tightly within an open end of the body opposite that end having the nipple. Two semicircular pieces fit about the pipe to form a collar and are drawn tightly against the gasket to compress it for forming a tight seal between the pipe and the body of the connector. Since the distance across the crimped end of the pipe is greater than the usual diameter of the pipe, the washer is split such that it can be expanded while it is being slid over the crimped end of the pipe. The inside surfaces of the two semicircular pieces of the collar have inside circumferential grooves to aid in gripping the pipe securely.

DESCRIPTION OF THE PREFERRED EMBODIMENT

Figure 1:
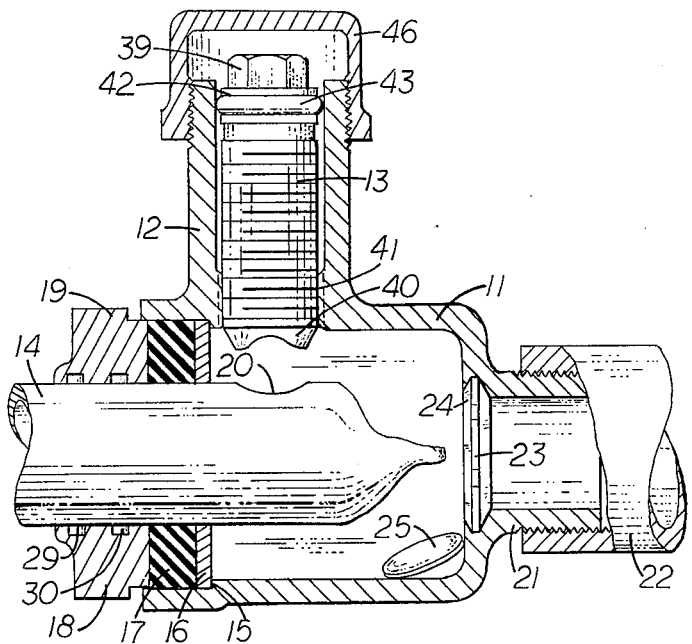
FIG. 1 is a longitudinal cross-sectional view of the pipe connector and hole cutter of this invention.
Figure 2:
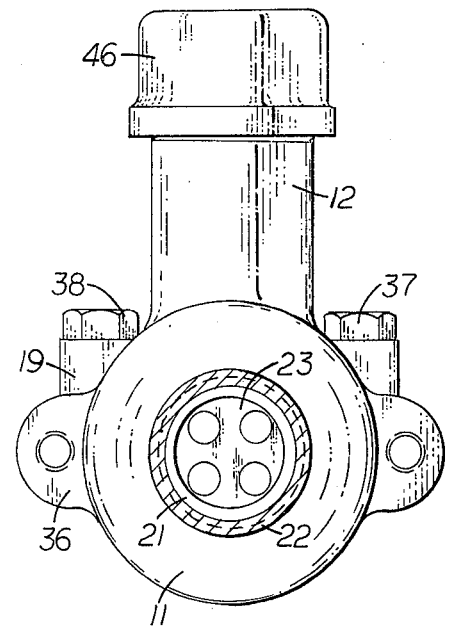
FIG. 2 is an end view to show a coarse screen over a coupling at the output end of the connector.
Figure 3:
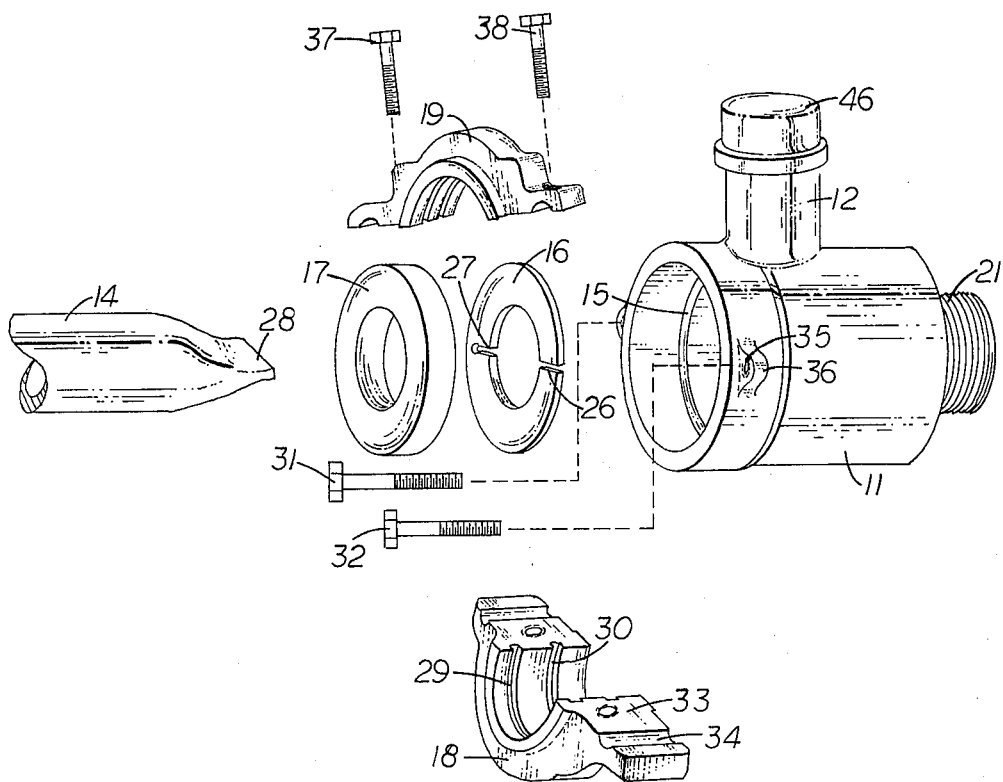
FIG. 3 is an exploded view of the connector.

A main part of the pipe connector and hole cutter of this invention as shown in FIGS. 1-3 is a hollow body 11, preferably cylindrical, with a lateral, tubular extension 12 containing, as shown in FIG. 1, a screw-type cutter 13. The closed end of a pipe 14 to which connection is to be made is retained axially within the main part of the body 11 by a stiff washer 16, an annular resilient gasket 17, and a collar comprising two semicircular halves 18 and 19 (FIG. 3). To assemble the body 11 to the end of the pipe 14, the resilient washer 17 is first positioned over the end of the pipe, and then the washer 16 that is usually metal is positioned over the end of the pipe adjacent the gasket 17. The washer 16 is split as described below to facilitate its being spread to fit over the crimped end of the pipe 14. The washer 16 and the gasket 17 fit quite closely about the pipe 14 and within an open end of the body 11. An inside circumferential shoulder 15 (FIGS. 1 and 3) within the end of the body is somewhat farther from the end of the body than the combined thicknesses of the washer 16 and the gasket 17. The washer 16 and the gasket 17 are placed at a distance from the closed end of the pipe 14 to hold the pipe axially within the body 11 with the closed end of the pipe 14 being a short distance from the opposite end or outlet. The collar comprising the halves 18 and 19 is then tightened about the pipe 14 and drawn inwardly against the end of the body 11 to compress the gasket 17 for providing a tight seal between the pipe 14 and the body 11 and to hold the body 11 rigidly to the pipe 14. The cutter 13 is turned inwardly on screw threads to cut a hole 20 (FIG. 1) through the wall of the pipe 14 and is then turned outwardly to leave the hole unobstructed.

At the outlet of the housing 11, a coaxial nipple 21 is provided for connecting a pipe 22 (FIG. 1) that is to receive flow of fluid from the pipe 14. The cutting of the hole 20 leaves a loose slug 25 within the body 11, and this slug must not be permitted to travel into the pipe 22 where it might cause an obstruction. To retain the slug within the body 11, a perforated disk 23 that functions as a coarse screen (FIG. 2) is pressed tightly within a recess 24 at the outlet of the body 11 over the inlet of the nipple 21.

The assembly of the collar and the seal for retaining the body 11 over the end of the pipe 14 can best be seen with reference to FIG. 3. The inside diameter just inside the opening for the inlet of the body 11 is somewhat greater than the diameter along most of the length of the body to provide the shoulder 15 against which the washer 16 rests. The washer 16 differs from a usual metal washer in that a slit 26 is cut across one portion, and a slot 27 through a diametrical portion extends outwardly from the central hole and preferably terminates in a small hole spaced a short distance from the periphery. For example, a washer might have a thickness of 3.175 mm, an outside diameter of 44 mm, an inside diameter of 22.7 mm, the slit 26 and the slot 27 being 0.8 mm across, and the slot 27 terminating at a distance 4.8 mm from the periphery.

The semicircular pieces 18 and 19 for the collar have within their inner surfaces spaced, circumferential grooves 29 and 30 of such width and spacing to cause small ridges on the pipe 14 when the pieces 18 and 19 are drawn tightly together around the pipe. Each end of the semicircular pieces 18 and 19 extends outwardly in substantially a radial direction and contains a hole in a tangential direction for receiving a screw 37 or 38 that slides freely within the hole in one of the pieces 18 and 19 and is turned into a threaded hole of the other piece. Each of the radial ends 33 extends past a respective mounting hole for one of the screws 37 and 38 and has a one-half cylindrical groove 34 in an axial direction with respect to the curved surface of the respective piece 18 or 19, the grooves 34 at respective ends of the pieces 18 and 19 registering to form a single hole, and the distance between the holes at the ends of the assembled pieces 18 and 19 being the same as the distance between threaded mounting holes 35 on diametrically positioned ears 36 protruding from the outer surface and close to the end of the body 11.

After the gasket 17 and the washer 16 are placed over the end of the pipe 14, the two halves 18 and 19 for a collar are assembled with screws 37 and 38 about the pipe 14 adjacent the gasket 17 such that the end of the pipe 14 extends beyond the pieces 18 and 19 a distance somewhat less than the length of the hollow space within the body 11. The screws 37 and 38 are then tightened securely, and the screws 31 and 32 are inserted through the holes formed by the grooves 34 and are driven evenly into the respective threaded holes 35 of the ears 36. A pipe 22 as shown in FIG. 1 is then connected to the output nipple 21 before the cutter 13 is operated to open the pipe 14 by cutting a hole 20 in the wall of the pipe at a position close to the washer 16.

Figure 4:
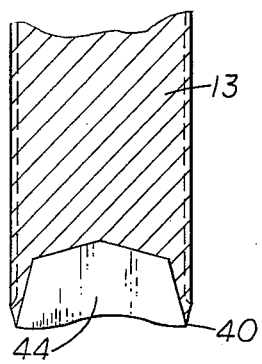
FIG. 4 is a fragmentary side view of the cutter.
Figure 5:
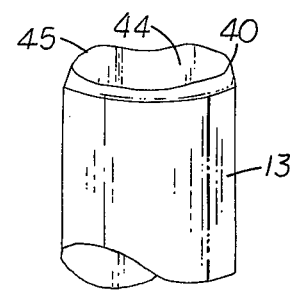
FIG. 5 is a fragmentary perspective end view of the cutter.

With reference to FIGS. 1, 4, and 5, the cutter 13 is preferably generally shaped like a screw having a hex head 39 at its outer end within the tubular extension 12 and a cutting edge 40 as a wavy, circular knife at the opposite end facing the pipe 14. Outside threads of the cutter 13 mate with inside threads 41 within the inner end of the tubular extension 12, and the outer end has adjacent the hex head 39 a groove 42 for receiving an O-ring 43 that seals the outer end of the cutter 13 within the extension 12. With particular reference to FIGS. 4 and 5, the cutting edge 40 is formed by gradually tapering inwardly the outer periphery of the lower end of the screw and by forming a recess 44 centered within the end of the cutter 13. As viewed in the cross section shown in FIG. 4, the outer tapered edge of the end of the screw and the inner surface of the cavity 44 meet at a sharp, acute angle to form a knife edge. A side view of the end of the cutter 13 shows that the cutting edge is wavy in the form of one or more scallops 45. Of several different shaped cutting edges that have been tried, only the knife edge with two scallops 45 cut the opening 20 in the pipe 14 by forming a single slug 25 without making metal particles that might undesirably flow along the pipe 22. Obviously, the holes in the perforated disk or screen 23 as shown in FIG. 2 may be quite large to allow full flow of fluid without permitting passage of the slug 25.

After the cutter is connected between the pipes 14 and 22, a cap 46 is removed from the outer end of the tubular extension 12, and a suitable hex wrench is used to rotate the cutter 13 inwardly until the slug 25 is cut from the pipe 14; the cutter 13 is then rotated outwardly until it is substantially centered in the extension 12; and the cap 46 is tightened on the outer end of the extension 12 to close the extension 12 permanently. By having the shoulder 15 of the body 11 close to the opening in extension 12, the cutting tool 13 engages the pipe 14 at a point where leverage for moving the pipe laterally within the gasket 17 and the retaining pieces 18 and 19 is small.

Providing washers 16 and gaskets 17 having different sizes of holes are available, the rest of the parts of the connectors and hole cutters may be used for different pipes within a moderate range of sizes. Therefore, by having a good assortment of gaskets and washers, only a few sizes of complete connectors and cutters need to be carried in stock.

I claim:

1. A pipe connector and pipe hole cutter comprising:
   a hollow body to enclose an end of a first pipe, said end being closed and said pipe containing fluid under pressure, said hollow body having an open input end to be placed about said end of said first pipe and an opposite output end terminating in a pipe coupling to which a second pipe is to be connected,
   a collar and a seal adapted to embrace said first pipe and to be connected to said input end of said hollow body, fastening means between said collar and said body to be tightened for positioning rigidly a substantial length of said end of said first pipe within said body and for providing a fluid seal between said first pipe and said end of said body,
   said body having a lateral tubular extension for receiving said pipe hole cutter, said pipe hole cutter being contained within said extension and having a cutting end facing an adjacent portion of said first pipe, sealing means disposed between said pipe cutter and said extension to prevent flow of fluid through said extension, said cutter being movable inwardly directly toward said first pipe to cut a hole through the wall thereof and then movable outwardly to leave said hole unobstructed, said extension being positioned at a predetermined distance from said one end of said body to cut said hole close to an inner side of said collar and seal, and
   said body having its inner wall spaced from said first pipe at least in the area about said hole and along a line to said pipe coupling to provide sufficient passageway for fluid to flow freely from said hole to said pipe coupling.

2. A pipe connector and pipe hole cutter as claimed in claim 1 wherein said cutter has a circular knife edge for cutting out cleanly a single slug for said hole, and a perforated member as a coarse screen is disposed across said pipe coupling to prevent movement of said slug into said second pipe.

3. A pipe connector and pipe hole cutter as claimed in claim 1 wherein said input end of said body has an inside peripheral shoulder, said seal includes a resilient gasket and a firm washer to be slid successively over said closed end of said first pipe, said washer having required outside and inside dimensions to fit on said shoulder and closely about said first pipe respectively, said washer having a split across a portion thereof and an opposite slot to facilitate spreading said washer as required to slide said washer over said closed end of said pipe.

4. A pipe connector and pipe hole cutter as claimed in claim 1 wherein said collar is two semicircular halves with screw means for tightening said halves around said first pipe, said halves having a plurality of spaced inside circumferential grooves of suitable width for forming gripping ridges around said first pipe.

* * * * *